(12) United States Patent
Higa (10) Patent No.: US 10,836,396 B2
(45) Date of Patent: Nov. 17, 2020

(54) HYBRID VEHICLE

(71) Applicant: TOYOTA JIDOSHA KABUSHIKI KAISHA, Toyota (JP)

(72) Inventor: Mitsuaki Higa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/249,299

(22) Filed: Jan. 16, 2019

(65) Prior Publication Data

US 2019/0225221 A1 Jul. 25, 2019

(30) Foreign Application Priority Data

Jan. 19, 2018 (JP) .................... 2018-007220

(51) Int. Cl.
| | | |
|---|---|---|
| *B60W 20/13* | (2016.01) | |
| *B60W 30/182* | (2020.01) | |
| *B60K 6/20* | (2007.10) | |
| *B60W 10/06* | (2006.01) | |
| *B60K 35/00* | (2006.01) | |
| *B60W 10/08* | (2006.01) | |
| *B60W 50/08* | (2020.01) | |
| *B60W 50/14* | (2020.01) | |

(52) U.S. Cl.
CPC ............ *B60W 30/182* (2013.01); *B60K 6/20* (2013.01); *B60K 35/00* (2013.01); *B60W 10/06* (2013.01); *B60W 10/08* (2013.01); *B60W 20/13* (2016.01); *B60W 50/082* (2013.01); *B60K 2310/00* (2013.01); *B60K 2370/155* (2019.05); *B60K 2370/156* (2019.05); *B60K 2370/1515* (2019.05); *B60K 2370/162* (2019.05); *B60K 2370/172* (2019.05); *B60K 2370/174* (2019.05); *B60K 2370/1876* (2019.05); *B60W 2050/146* (2013.01); *B60Y 2200/92* (2013.01); *B60Y 2300/182* (2013.01)

(58) Field of Classification Search
CPC ................................................ B60W 30/182
See application file for complete search history.

(56) References Cited

U.S. PATENT DOCUMENTS

| | | | | |
|---|---|---|---|---|
| 7,710,252 | B2* | 5/2010 | Kaya .................. | B60K 35/00 340/459 |
| 8,653,960 | B2* | 2/2014 | Hanna ................. | B60W 10/06 340/441 |
| 10,046,639 | B2* | 8/2018 | Tane ................... | B60K 35/00 |
| 10,121,285 | B2* | 11/2018 | Ito ....................... | G09G 5/10 |
| 2002/0171541 | A1* | 11/2002 | Cronnbez Dale Scott ............. | B60R 16/0232 340/461 |
| 2010/0102945 | A1* | 4/2010 | Watson ............... | B60K 35/00 340/462 |

(Continued)

FOREIGN PATENT DOCUMENTS

| | | |
|---|---|---|
| JP | 4604749 B2 | 1/2011 |
| JP | 5682686 B2 | 3/2015 |

*Primary Examiner* — Peter D Nolan
*Assistant Examiner* — Luat T Huynh
(74) *Attorney, Agent, or Firm* — Sughrue Mion, PLLC (57) ABSTRACT

A hybrid vehicle comprises an engine, a motor and a meter display device. The hybrid vehicle is configured to display a tachometer on the meter display device in response to selection of a sport mode in a CS mode and to display a power meter on the meter display device irrespective of selection of the sport mode in a CD mode.

1 Claim, 4 Drawing Sheets (56) References Cited

U.S. PATENT DOCUMENTS

| | | | | |
|---|---|---|---|---|
| 2012/0029837 A1* | 2/2012 | Katoh | ............... | B60K 35/00 |
| | | | | 702/33 |
| 2012/0188068 A1* | 7/2012 | Hanna | ............... | B60W 10/06 |
| | | | | 340/441 |
| 2012/0319828 A1* | 12/2012 | Krauss | ............... | B60K 35/00 |
| | | | | 340/425.5 |
| 2015/0379776 A1* | 12/2015 | Ito | ............... | G02B 27/0101 |
| | | | | 345/419 |
| 2019/0248240 A1* | 8/2019 | Fujita | ............... | B60K 37/00 |

* cited by examiner

HYBRID VEHICLE

CROSS-REFERENCE TO RELATED APPLICATIONS

The present disclosure claims priority to Japanese Patent Application No. 2018-007220 filed Jan. 19, 2018, which is incorporated herein by reference in its entirety including specification, drawings and claims.

TECHNICAL FIELD

The present disclosure relates to a hybrid vehicle.

BACKGROUND

A proposed hybrid vehicle is provided with a meter display panel configured to change over a display between a power meter display that shows a change in engine output power output from an engine and a tachometer display that shows a change in rotation speed of the engine (as described in, for example, JP-4604749B). This hybrid vehicle displays a power meter on the meter display panel when a shift position is not set in a sequential shift (S) range, while displaying a tachometer on the meter display panel when the shift position is set in the S range.

SUMMARY

A known configuration causes the hybrid vehicle to be driven with changeover between a CD (Charge Depleting) mode and a CS (Charge Sustaining) mode. The CD mode is, for example, a mode that gives priority to a motor drive which causes the hybrid vehicle to be driven without operation of the engine to a hybrid drive which causes the hybrid vehicle to be driven with operation of the engine, compared with the CS mode. Another known configuration allows the hybrid vehicle to select a sport mode by the driver's switch operation. The sport mode is, for example, a mode that causes the engine to be operated with a relatively high load by increasing a required torque corresponding to an accelerator position to be larger than an ordinary level or by setting a lower limit rotation speed of the engine according to the vehicle speed. This hybrid vehicle is expected to provide the tachometer display to allow the driver to visually check a change in rotation speed of the engine, in response to selection of the sport mode. In the CD mode that gives priority to the motor drive, however, the tachometer display provided in response to selection of the sport mode indicates the rotation speed of the engine that is equal to zero in most situations during a run and thereby gives the driver a feeling of strangeness.

A hybrid vehicle of the present disclosure, which is configured to be driven with changeover between a CD (Charge Depleting) mode and a CS (Charge Sustaining) mode and to allow for selection of a sport mode, mainly aims to provide a driver with useful information fit for respective modes.

In order to achieve the above primary object, the hybrid vehicle of the present disclosure employs the following configuration.

The present disclosure is directed to a hybrid vehicle. The hybrid vehicle includes an engine, a motor, a power storage device configured to transmit electric power to and from the motor, a controller configured to control the engine and the motor such that the hybrid vehicle is driven with changeover between a CD or Charge Depleting mode and a CS or Charge Sustaining mode and a meter display device configured to change over a display from a power meter display that displays a power used for driving to a tachometer display that displays a rotation speed of the engine, in response to a switch operation. The hybrid vehicle further includes a sport mode switch that is operated to select a sport mode. The meter display device provides the tachometer display in response to selection of the sport mode in the CS mode and provides the power meter display irrespective of selection of the sport mode in the CD mode.

The hybrid vehicle of this aspect provides the tachometer display in response to selection of the sport mode in the CS mode, while providing the power meter display irrespective of selection of the sport mode in the CD mode. In the CS mode that gives priority to the hybrid drive with operation of the engine, this configuration provides the tachometer display and thereby gives the driver the sporty impression fit for the sport mode. In the CD mode that gives priority to the motor drive without operation of the engine, on the other hand, this configuration does not provide the tachometer display and thereby suppresses the drive from feeling strange by the tachometer display during the motor drive. As a result, this configuration provides the driver with useful information fit for the respective modes.

DESCRIPTION OF EMBODIMENTS

The following describes some aspects of the disclosure with reference to embodiments.

Figure 1:
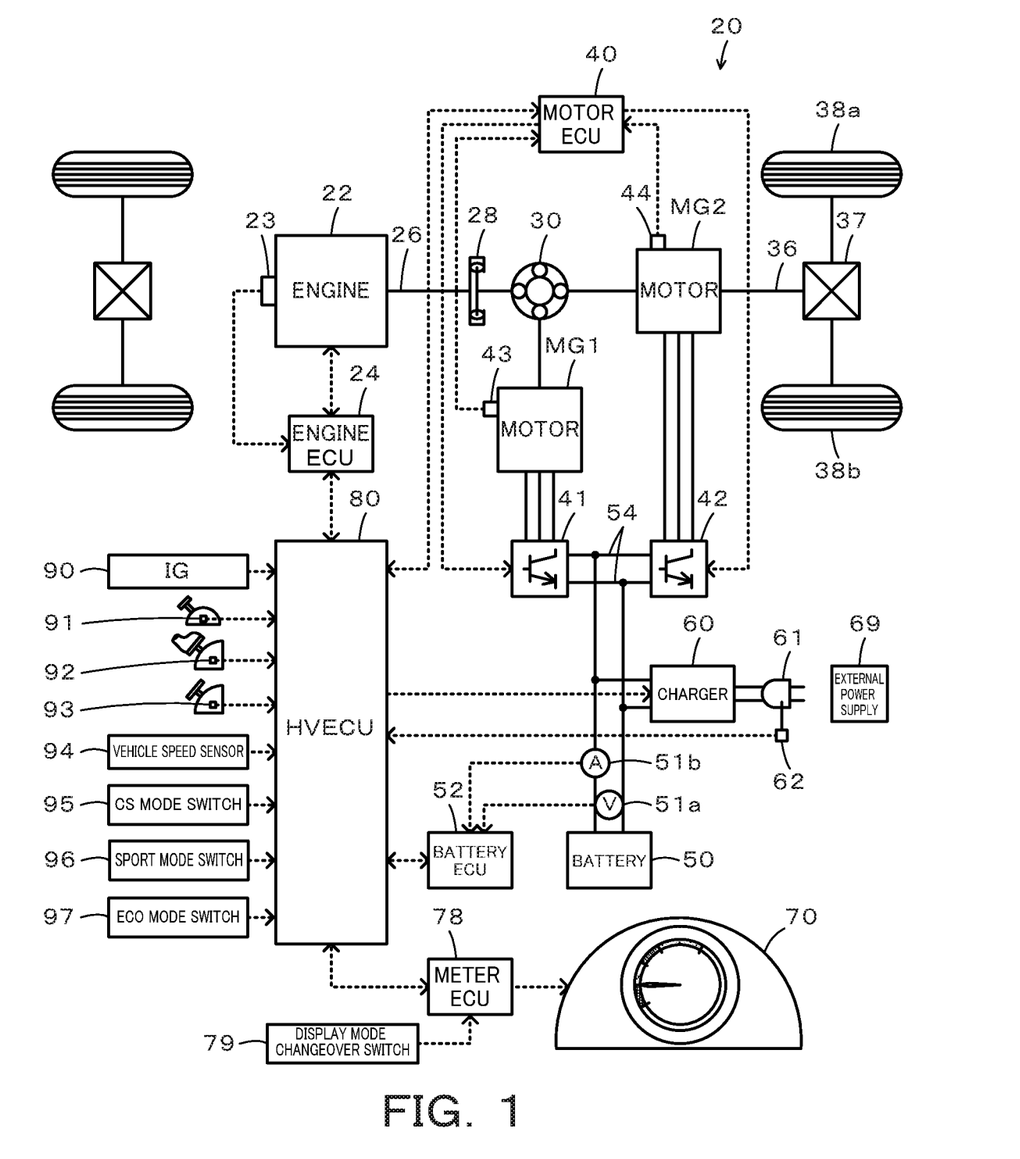
FIG. 1 is a configuration diagram illustrating the schematic configuration of a hybrid vehicle according to one embodiment of the present disclosure.

FIG. 1 is a configuration diagram illustrating the schematic configuration of a hybrid vehicle 20 according to one embodiment of the present disclosure. As illustrated, the hybrid vehicle 20 of the embodiment includes an engine 22, a planetary gear 30, motors MG1 and MG2, inverters 41 and 42, a battery 50, a charger 60, a meter 70 and a hybrid electronic control unit (hereinafter referred to as "HVECU") 80.

The engine 22 is configured as an internal combustion engine that outputs power using, for example, gasoline or light oil as a fuel. This engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23 configured to detect the rotational position of a crankshaft 26 of the engine 22, are input into the engine ECU 24 via the input port. Various control signals for operation control of the engine 22 are output from the engine ECU 24 via the output port. The engine ECU 24 is connected with the HVECU 80 via the respective communication ports. The engine ECU 24 calculates a rotation speed Ne of the engine 22, based on the crank angle θcr input from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 38a and 38b via a differential gear 37. The planetary gear 30 further includes a carrier that is connected with the crankshaft 26 of the engine 22 via the damper 28.

The motor MG1 may be configured, for example, as a synchronous generator motor and includes the rotor that is connected with the sun gear of the planetary gear 30 as described above. The motor MG2 may be configured, for example, as a synchronous generator motor and includes a rotor that is connected with the driveshaft 36. The inverters 41 and 42 are used to respectively drive the motors MG1 and MG2 and are connected with the battery 50 via power lines 54. A motor electronic control unit (hereinafter referred to as "motor ECU") 40 performs switching control of a plurality of switching elements (not shown) respectively included in the inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2, for example, rotational positions θm1 and θm2 from rotational position detection sensors 43 and 44 configured to detect the rotational positions of the respective rotors of the motors MG1 and MG2, are input into the motor ECU 40 via the input port. The motor ECU 40 outputs via the output port, for example, switching control signals to the plurality of switching elements included in the respective inverters 41 and 42. The motor ECU 40 is connected with the HVECU 80 via the respective communication ports. The motor ECU 40 calculates rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured as, for example, a lithium ion rechargeable battery or a nickel metal hydride battery and is connected with the inverters 41 and 42 via the power lines 54 as described above. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50, for example, a voltage Vb of the battery 50 from a voltage sensor 51a placed between terminals of the battery 50 and an electric current Ib of the battery 50 from a current sensor 51b mounted to an output terminal of the battery 50, are input into the battery ECU 52 via the input port. The battery ECU 52 is connected with the HVECU 80 via the respective communication ports. The battery ECU 52 calculates a state of charge SOC, based on an integrated value of the electric current Ib of the battery 50 input from the current sensor 51b. The state of charge SOC denotes a ratio of the capacity of electric power dischargeable from the battery 50 to the overall capacity of the battery 50.

The charger 60 is connected with the power lines 54. This charger 60 is configured to charge the battery 50 using electric power from an external power supply 69 such as a household power supply or an industrial power supply when a power plug 61 is connected with the external power supply 69 at a charging point, for example, at home or at a charging station. The charger 60 is controlled by the HVECU 80 to supply the electric power from the external power supply 69 to the battery 50 when the power plug 61 is connected with the external power supply 69.

The meter 70 is placed in front of a driver's seat and is configured as a display such as a liquid crystal display device to change over the display between a power meter display that displays a driving power used for driving and a tachometer display that displays the rotation speed of the engine 22. The display contents of the meter 70 are controlled by a meter electronic control unit (hereinafter referred to as "meter ECU") 78. The meter 70 and the meter ECU 78 according to the embodiment correspond to the meter display device.

The meter ECU 78 is configured as a CPU-based microprocessor and includes a ROM configured to store processing programs, a RAM configured to temporarily store data, input/output ports and a communication port, in addition to the CPU, although not being illustrated. Signals required for control of the meter 70, for example, a switch signal from a display mode changeover switch 79, are input into the meter ECU 78 via the input port. The meter ECU 78 outputs, for example, a display signal to the meter 70 via the output port. The display mode changeover switch 79 is an operation switch used to change over a display mode between a tachometer display mode that provides the tachometer display on the meter 70 and a power meter display mode that provides the power meter display on the meter 70. The meter ECU 78 is connected with the HVECU 80 via the respective communication ports.

The HVECU 80 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 80 via the input port. The signals input into the HVECU 80 include, for example, an ignition signal from an ignition switch 90, a shift position SP from a shift position sensor 91, an accelerator position Acc from an accelerator pedal position sensor 92 and a brake pedal position BP from a brake pedal position sensor 93. The input signals also include a vehicle speed V from a vehicle speed sensor 94, a switch signal from a CS mode switch 95, a switch signal from a sport mode switch 96, a switch signal from an Eco mode switch 97, and a connection signal from a connection switch 62 that is mounted to the power plug 61 and that is configured to determine whether the power plug 61 is connected with the external power supply 69. The HVECU 80 outputs, for example, a control signal to the charger 60 via the output port. The HVECU 80 is connected with the engine ECU 24, the motor ECU 40, the battery ECU 52 and the meter ECU 78 via the respective communication ports as described above.

The hybrid vehicle 20 of the embodiment having the above configuration is driven by motor drive (EV drive) or by hybrid drive (HV drive) in a CD mode (Charge Depleting mode) or in a CS mode (Charge Sustaining mode). The CD mode gives priority to the EV drive, compared with the CS mode. The HV drive denotes a mode in which the hybrid vehicle 20 is driven with operation of the engine 22. The EV drive denotes a mode in which the hybrid vehicle 20 is driven without operation of the engine 22.

When the hybrid vehicle 20 is at stop with a system-off (a system stop) at a charging point, for example, at home or at a charging station, in response to connection of the power plug 61 with the external power supply 69, the HVECU 80 controls the charger 60 to charge the battery 50 using electric power from the external power supply 69. When the state of charge SOC of the battery 50 is higher than a threshold value Shv1 (for example, 45%, 50% or 55%) at the time of a system-on (a system start), the hybrid vehicle 20 is driven in the CD mode until the state of charge SOC of the battery 50 becomes equal to or lower than a threshold value Shv2 (for example, 25%, 30% or 35%). The hybrid vehicle 20 is driven in the CS mode until a system-off after the state of charge SOC of the battery 50 becomes equal to or lower than the threshold value Shv2. When the state of charge SOC of the battery 50 is equal to or lower than the threshold value Shv1 at the time of a system-on, on the other hand, the hybrid vehicle 20 is driven in the CS mode until a system-off. Additionally, when the CS mode switch 95 is operated during a run in the CD mode, the hybrid vehicle 20 starts driving in the CS mode. When the CS mode switch 95 is operated again during a run in the CS mode set by an operation of the CS mode switch 95, the drive mode of the hybrid vehicle 20 is changed over to the CD mode.

During a run by the HV drive, the HVECU 80 first sets a required torque Tr* that is required for driving (i.e., that is to be output to the driveshaft 36), based on the accelerator position Acc from the accelerator pedal position sensor 92 and the vehicle speed V from the vehicle speed sensor 94. The HVECU 80 subsequently calculates a driving required power Pdrv* that is required for driving by multiplying the set required torque Tr* by a rotation speed Nr of the driveshaft 36. The rotation speed Nr of the driveshaft 36 used may be the rotation speed Nm2 of the motor MG2 or a rotation speed obtained by multiplying the vehicle speed V by a conversion factor. The HVECU 80 then sets a required power Pe* that is required for the vehicle by adding a charge-discharge required power Pb* of the battery 50 (which takes a positive value when the battery 50 is charged) to the calculated driving required power Pdrv*. The charge-discharge required power Pb* is set based on a difference ΔSOC between the state of charge SOC of the battery 50 and a target state of charge SOC*, such as to decrease the absolute value of the difference ΔSOC. The HVECU 80 subsequently sets a target operation point (a target rotation speed Ne* and a target torque Te*) of the engine 22 and torque commands Tm1* and Tm2* of the motors MG1 and MG2, such as to cause the required power Pe* to be output from the engine 22 and to cause the required torque Tr* to be output to the driveshaft 36. A procedure of setting the target operation point of the engine 22 (the target rotation speed Ne* and the target torque Te*) may specify in advance an optimum operation line that provides the optimum fuel consumption by taking into account the noise, the vibration and the like among operation points (rotations speed and torques) of the engine 22 and read an operation point (a rotation speed and a torque) on the optimum operation line corresponding to the required power Pe*. The HVECU 80 sends the target operation point (the target rotation speed Ne* and the target torque Te*) of the engine 22 to the engine ECU 24, while sending the torque commands Tm1* and Tm2* of the motors MG1 and MG2 to the motor ECU 40. The engine ECU 24 performs, for example, intake air flow control, fuel injection control and ignition control of the engine 22, such as to operate the engine 22 based on the target operation point. The motor ECU 40 performs switching control of the respective switching elements included in the inverters 41 and 42, such as to drive the motors MG1 and MG2 with the torque commands Tm1* and Tm2*.

During a run by the EV drive, the HVECU 80 first sets the required torque Tr*, based on the accelerator position Acc from the accelerator pedal position sensor 92 and the vehicle speed V from the vehicle speed sensor 94, and calculates the driving required power Pdrv* by multiplying the required torque Tr* by the rotation speed Nr of the driveshaft 36. The HVECU 80 subsequently sets the torque command Tm1* of the motor MG1 to a value 0 and sets the torque command Tm2* of the motor MG2, such as to cause the required torque Tr* (driving required power Pdrv*) to be output to the driveshaft 36. The HVECU 80 sends the torque commands Tm1* and Tm2* of the motors MG1 and MG2 to the motor ECU 40. The motor ECU 40 controls the inverters 41 and 42 as described above.

The sport mode switch 96 is operated to change over the engine 22 to a sport mode that provides more powerful enjoyable sport drive than an ordinary mode that operates the engine 22 with a predetermined load. The sport mode may operate the engine 22 with a relatively high load by setting a larger required torque Tr* corresponding to the accelerator position Acc detected by the accelerator pedal position sensor 92 than the level in the ordinary mode. The sport mode may also prohibit operation stop of the engine 22 (EV drive). The sport mode may further set a lower limit rotation speed of the engine 22 according to the vehicle speed V and thereby operate the engine 22 with a relatively high load. The eco mode switch 97 is operated to change over the engine 22 to an eco mode that gives priority to fuel consumption even at the cost of the ride quality to some extent, compared with the ordinary mode. The eco mode may set a smaller required torque Tr* corresponding to the accelerator position Acc detected by the accelerator pedal position sensor 92 than the level in the ordinary mode. The eco mode may also increase intermittent stop of the engine 22. The eco mode may further operate the engine 22 at a most efficient operation point even at the cost of vibration and some noise.

Figure 2:
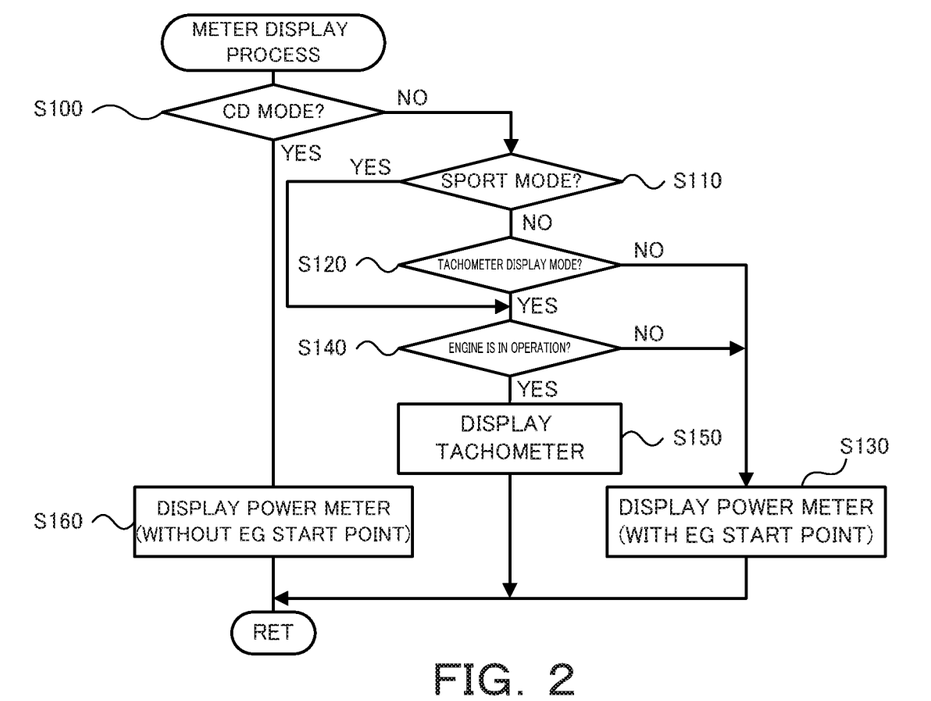
FIG. 2 is a flowchart showing one example of a meter display process performed by a meter ECU.

The following describes the operations of the hybrid vehicle 20 of the embodiment having the configuration described above or more specifically a series of display operations of the meter 70 during drive in the CD mode and a series of display operations of the meter 70 during drive in the CS mode. FIG. 2 is a flowchart showing one example of a meter display process performed by a meter ECU 78. This routine is performed repeatedly at predetermined time intervals (for example, every several msec or every several tens msec).

When the meter display process is triggered, the CPU of the meter ECU 78 first determines whether the hybrid vehicle 20 is in the CD mode or not (step S100). This determination may be made by receiving the determination result of either the CD mode or the CS mode by the HVECU 80, for example, based on the state of charge SOC of the battery 50 and the switch signal from the CS mode switch 95. When it is determined that the hybrid vehicle 20 is not in the CD mode but is in the CS mode, the CPU subsequently determines whether the hybrid vehicle 20 is in the sport mode or not (step S110). This determination may be made by receiving the determination result of the ordinary mode, the sport mode or the eco mode by the HVECU 80, based on the switch signal from the sport mode switch 97 and the switch signal from the eco mode switch 97.

Figure 3:
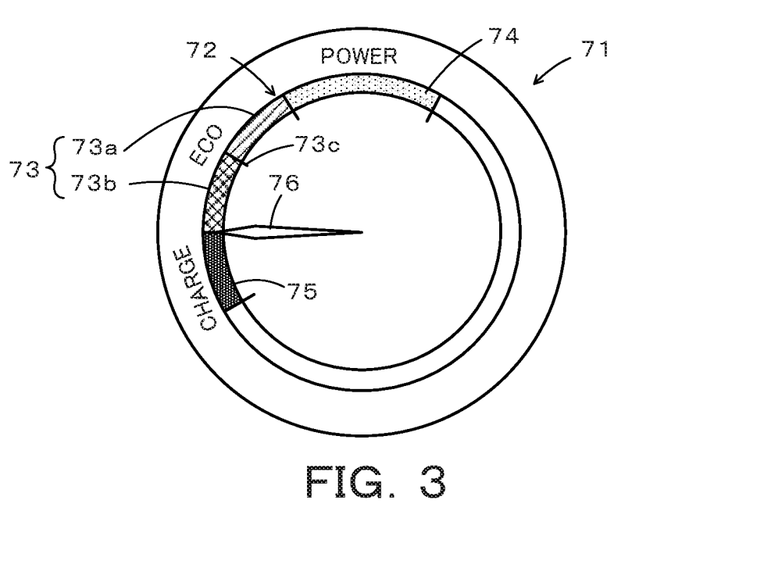
FIG. 3 is a diagram illustrating one example of a power meter displayed when a power meter display mode is selected in an ordinary mode or in an eco mode in a CS mode.

When it is determined at step S110 that the hybrid vehicle 20 is not in the sport mode but is either in the ordinary mode or in the eco mode, the CPU subsequently determines whether the display mode is the tachometer display mode, based on the switch signal from the display mode changeover switch 79 (step S120). When the display mode is not the tachometer display mode but is the power meter display mode, the CPU displays a power meter on the meter 70 (step S130) and terminates the meter display process. FIG. 3 illustrates one example of a power meter 71 displayed on the meter 70 when the hybrid vehicle 20 is in the ordinary mode or in the eco mode in the CS mode and the power meter display mode is selected. As shown in FIG. 3, the power meter 71 includes a power bar 72 that shows power, and an indicator 76. Indication on the power bar 72 by the indicator 76 provides a visible display of a driving power Pdrv that is currently used for driving. As shown in FIG. 3, the power bar 72 is an arc-shaped bar showing an overall power range that is settable as the driving power Pdrv. The power range includes an eco drive range 73, a power drive range 74, and a regenerative drive range 75, which are respectively displayed in different colors. Scale marks are displayed on the boundaries of the respective ranges as discrimination information for discrimination of the respective ranges. The eco drive range 73 denotes a power range that gives priority to the fuel consumption and that has the driving power Pdrv lower than an upper limit power Pa (for example, 50 kW) or more specifically an upper limit of power which allows the vehicle to be driven at a favorable fuel consumption and which is set based on a relationship between the power output from the engine 22 and the fuel consumption and an electric power allowable to be output from the battery 50. The eco drive range 73 further includes an engine operation range 73*a* in which the engine 22 is operated and an engine stop range 73*b* in which the engine 22 is not operated. A scale mark displayed on the boundary between the engine operation range 73*a* and the engine stop range 73*b* shows an engine start point 73*c*. The power drive range 74 denotes a power range that gives priority to the output over the fuel consumption and that has the driving power Pdrv equal to or higher than the upper limit power Pa. The regenerative drive range 75 denotes a power range in which the driving power Pdrv has a negative value, i.e., the motor MG2 is under regenerative control. The driver performs an accelerator operation with checking the power meter 71, so that the hybrid vehicle 20 may be driven by the EV drive with the driving power Pdrv as the power in the engine stop range 73*b* or may be driven by the HV drive with the driving power Pdrv as the power in the engine operation range 73*a* or in the power drive range 74.

Figure 4:
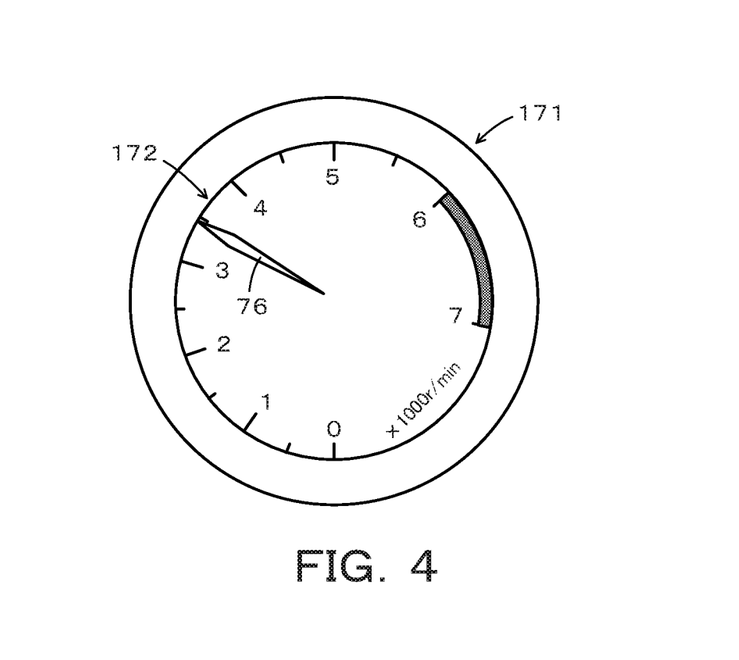
FIG. 4 is a diagram illustrating one example of a tachometer displayed when the hybrid vehicle is in a sport mode in the CS mode or when a tachometer display mode is selected in the CS mode.

When it is determined at step S110 that the hybrid vehicle 20 is in the sport mode or when it is determined at step S120 that the display mode is the tachometer display mode, the CPU subsequently determines whether the engine 22 is in operation (step S140). This determination may be made by receiving the present driving condition of the engine 22 from the HVECU 80. When it is determined that the engine 22 is in operation, the CPU displays a tachometer on the meter 70 (step S150) and then terminates the meter display process. When it is determined that the engine 22 is not in operation but is at stop, on the other hand, the CPU displays the power meter on the meter 70 (step S130), irrespective of the sport mode or the tachometer display mode. FIG. 4 illustrates one example of a tachometer 171 displayed on the meter 70 when the hybrid vehicle 20 is in the sport mode in the CS mode or when the tachometer display mode is selected in the CS mode. As shown in FIG. 4, the tachometer 171 includes a ring-shaped scale display portion 172 having scale numbers to show the rotation speed of the engine 22, and an indicator 76. Indication of the scale display portion 172 by the indicator 76 provides a visible display of the current rotation speed of the engine 22. As shown in FIG. 4, the scale display portion 172 includes scale numbers of 0 to 7 indicating the rotation speed from zero to an allowable upper limit rotation speed, and a code "×1000 r/min" for conversion of the scale numbers into the unit of rotation speed. When the sport mode is selected in the CS mode, the tachometer 171 is displayed. The driver views a change in engine rotation speed on the tachometer 171 and enjoys the sport drive.

Figure 5:
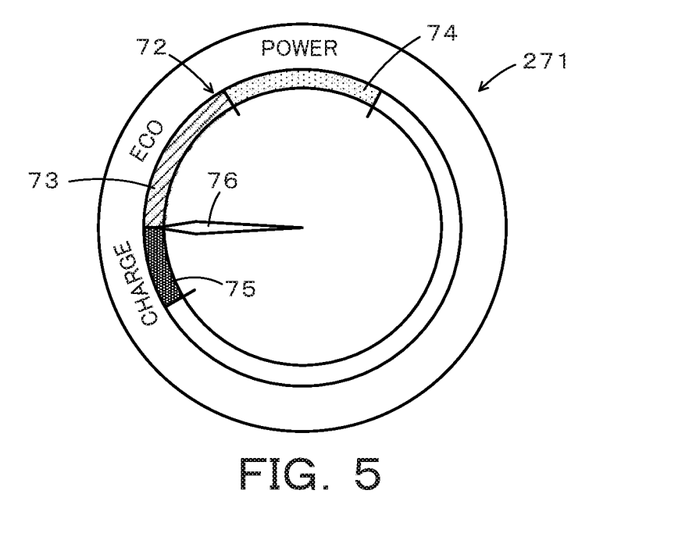
FIG. 5 is a diagram illustrating one example of a power meter displayed in a CD mode.

When it is determined at step S100 that the hybrid vehicle 20 is in the CD mode, the CPU displays the power meter on the meter 70 (step S160) regardless of whether the display mode is the power meter display mode or the tachometer display mode and then terminates the meter display process. FIG. 5 illustrates one example of a power meter 271 displayed in the CD mode. As shown in FIG. 5, like the power meter 71, the power meter 271 has a power bar 72 that includes an eco drive range 73, a power drive range 74 and a regenerative drive range 75. The power meter 271, however, differs from the power meter 71 by the configuration that the eco drive range 73 is not divided into the engine operation range 73*a* and the engine stop range 73*b* but is a single range. The power meter 271 is displayed in the CD mode, irrespective of the display mode. This is because that the CD mode gives priority to the EV drive without operation of the engine 22, compared with the CS mode and the tachometer display indicates only 0 in most situations. The tachometer display is thus expected to be not useful for the driver. The power meter 271 accordingly does not display the engine start point 73*c*.

As described above, the hybrid vehicle 20 of the embodiment provides the tachometer display in response to the sport mode in the CS mode, while providing the power meter display even in the case of selection of the sport mode in the CD mode. Accordingly, in the CS mode that gives priority to the HV drive with operation of the engine 22, this configuration provides the tachometer display and thereby gives the driver a sporty impression suitable for the sport mode. In the CD mode that gives priority to the EV drive without operation of the engine 22, on the other hand, this configuration does not provide the tachometer display and thereby suppresses the driver from feeling strange by the tachometer display during the EV drive. As a result, this configuration provides the driver with useful information fit for the respective modes.

In the case of the power meter display in the CS mode, the hybrid vehicle 20 of the embodiment provides a display with discrimination between the engine operation range 73*a* in which the engine 22 is operated and the engine stop range 73*b* in which the engine 22 is not operated. In the case of the power meter display in the CD mode, on the other hand, the hybrid vehicle 20 of the embodiment provides a display without discrimination between the engine operation range 73*a* and the engine stop range 73*b*. This configuration accordingly suppresses less useful information from being displayed in the CD mode that gives priority to the EV drive.

According to the embodiment, the power meter 71 is displayed when the engine 22 is at stop, irrespective of selection of the sport mode in the CS mode. According to a modification however, the tachometer 171 may be displayed in response to selection of the sport mode in the CS mode, even when the engine 22 is at stop. According to another modification, the EV drive may be prohibited in response to selection of the sport mode in the CS mode. In the above modification, the processing of step S140 may be omitted in the meter display process of FIG. 2, and the tachometer 171 may be displayed in the sport mode or in the tachometer display mode. This does not stop the engine during a drive in the sport mode in the CS mode. This enhances the sporty impression and provides the driver with useful information by the tachometer display.

Figure 6:
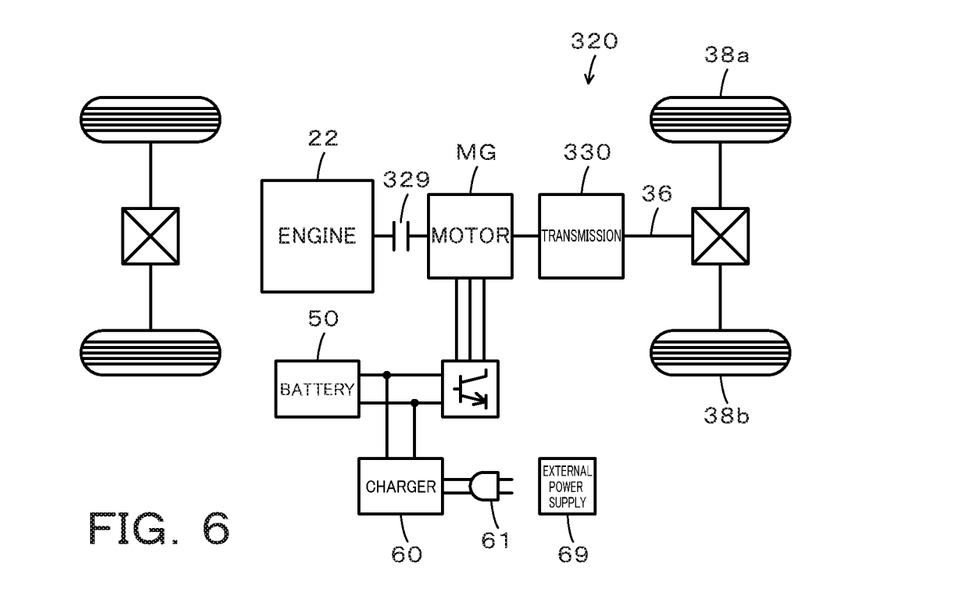
FIG. 6 is a configuration diagram illustrating the schematic configuration of another hybrid vehicle according to a modification.

The hybrid vehicle 20 of the embodiment is configured such that the planetary gear 30 is connected with the engine 22, the motor MG1 and the driveshaft 36 coupled with the drive wheels 38a and 38b and that the motor MG2 is connected with the driveshaft 36. As shown in FIG. 6, the present disclosure may be applied to a hybrid vehicle 320 of a modification configured such that a motor MG is connected via a transmission 330 with a driveshaft 36 coupled with drive wheels 38a and 38b and that an engine 22 is connected via a clutch 329 with a rotating shaft of the motor MG.

As described above, a hybrid vehicle according to one aspect of the present disclosure comprises an engine; a motor; a power storage device configured to transmit electric power to and from the motor; a controller configured to control the engine and the motor such that the hybrid vehicle is driven with changeover between a CD (Charge Depleting) mode and a CS (Charge Sustaining) mode; and a meter display device configured to change over a display from a power meter display that displays a power used for driving to a tachometer display that displays a rotation speed of the engine, in response to a switch operation. The hybrid vehicle further comprises a sport mode switch that is operated to select a sport mode. The meter display device provides the tachometer display in response to selection of the sport mode in the CS mode and provides the power meter display irrespective of selection of the sport mode in the CD mode.

The hybrid vehicle of this aspect provides the tachometer display in response to selection of the sport mode in the CS mode, while providing the power meter display irrespective of selection of the sport mode in the CD mode. In the CS mode that gives priority to the hybrid drive with operation of the engine, this configuration provides the tachometer display and thereby gives the driver the sporty impression fit for the sport mode. In the CD mode that gives priority to the motor drive without operation of the engine, on the other hand, this configuration does not provide the tachometer display and thereby suppresses the drive from feeling strange by the tachometer display during the motor drive. As a result, this configuration provides the driver with useful information fit for the respective modes.

In the hybrid vehicle of this aspect, the meter display device may display discrimination information that is used to discriminate between a power range with operation of the engine and a power range without operation of the engine, when the power meter display is provided in the CS mode, while not displaying the discrimination information when the power meter display is provided in the CD mode. This configuration prevents less useful discrimination information from being displayed in the CD mode that gives priority to the motor drive.

In the hybrid vehicle of another aspect, when the engine is at stop in the CS mode, the meter display device may provide the power meter display irrespective of selection of the sport mode. This configuration handles the situation that the engine is at stop, even in the case of selection of the sport mode in the CS mode.

In the hybrid vehicle of the above aspect, when the sport mode is selected in the CS mode, the controller may prohibit the motor drive that causes the hybrid vehicle to be driven with the engine at stop. This configuration does not stop the engine during a run in the sport mode, thereby enhancing the sporty impression and providing the driver with useful information by the tachometer display.

The following describes the correspondence relationship between the primary components of the embodiment and the primary components of the disclosure described in Summary. The engine 22 of the embodiment corresponds to the "engine", the motor MG2 corresponds to the "motor", the HVECU 80 corresponds to the "controller", and the meter 70 and meter ECU 78 corresponds to the "meter display device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the hybrid vehicle and so on.

The invention claimed is:
1. A hybrid vehicle, comprising:
an engine;
a motor;
a power storage device configured to transmit electric power to and from the motor;
a controller configured to change the engine and the motor between a Charge Depletion (CD) mode and a Charge Sustaining (CS) mode; a sport mode switch that is operated to select a sport mode; and
a meter display device configured to change over a display from a power meter display that displays a power used for driving to a tachometer display that displays a rotation speed of the engine, in response to an operation of the sport mode switch, wherein
the meter display device displays the tachometer display in response to selection of the sport mode in the CS mode and displays the power meter display irrespective of selection of the sport mode in the CD mode, wherein the meter display device displays discrimination information that is used to discriminate between a power range with operation of the engine and a power range without operation of the engine, when the power meter display is provided in the CS mode, while not displaying the discrimination information when the power meter display is provided in the CD mode.

\* \* \* \* \*